2 Sheets—Sheet 1.
C. F. PIKE.
Hydro Steam Engines.
No. 228,555.　　　　　　　　Patented June 8, 1880.
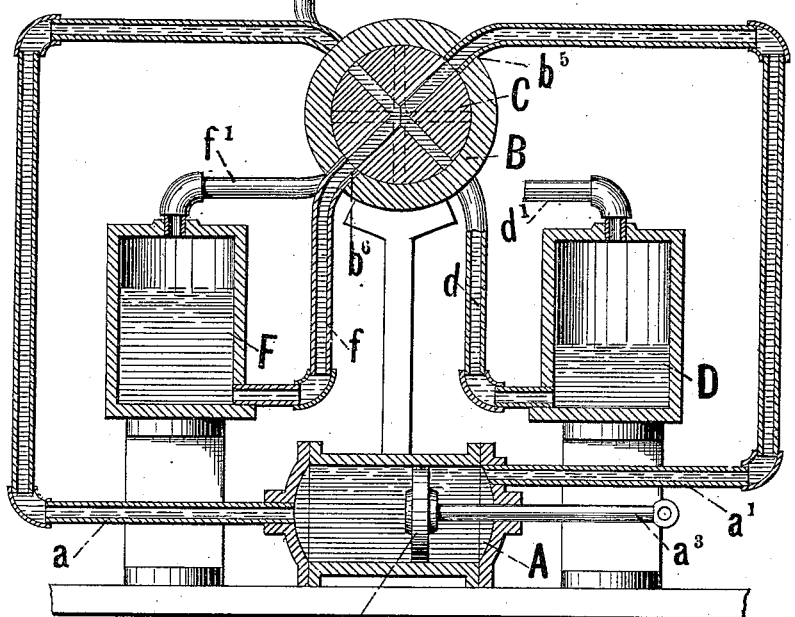
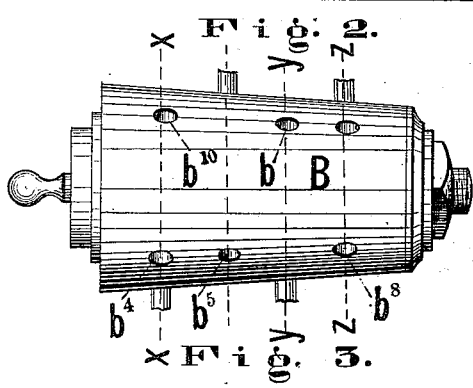
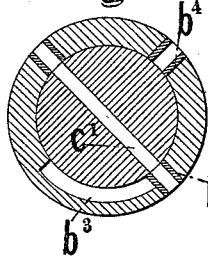
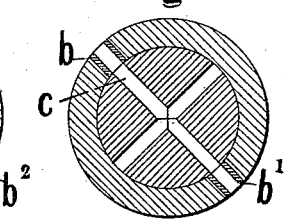
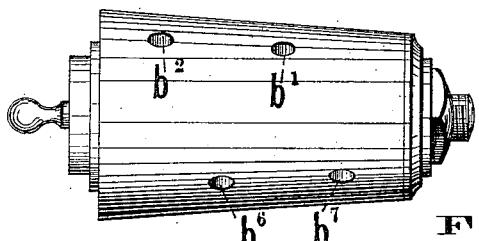
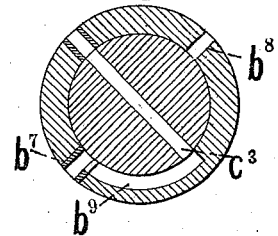
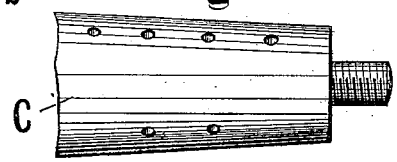
WITNESSES:
Cornelius Cox.
V. L. West
INVENTOR:
C. F. PIKE,
BY
H. W. Beadle & Co.
ATTYS.

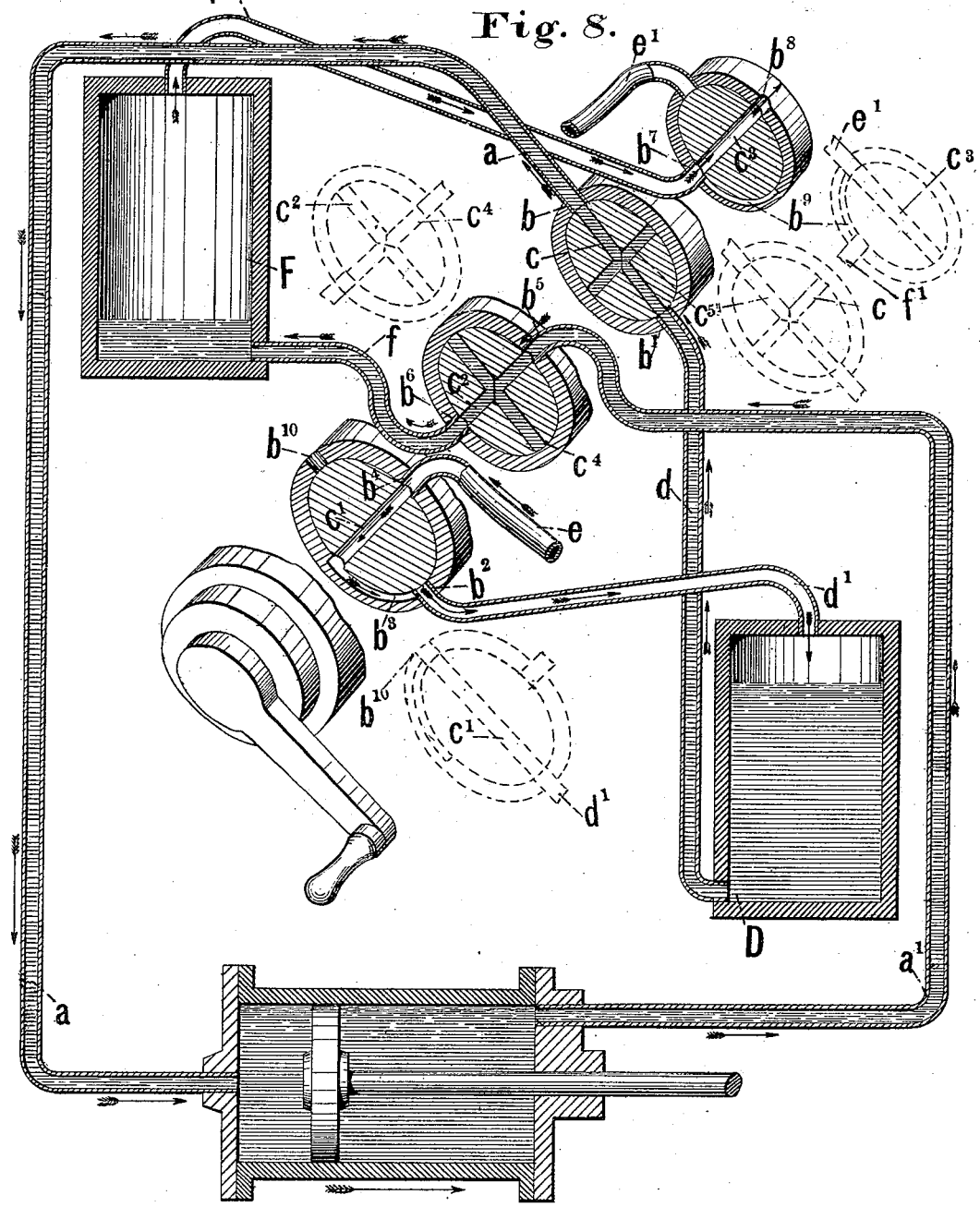

United States Patent Office.

CHARLES F. PIKE, OF PHILADELPHIA, PENNSYLVANIA, ASSIGNOR TO THE INTERNATIONAL SUBMARINE COMPANY, OF NEW HAVEN, CONN.

HYDRO-STEAM-ENGINE.

SPECIFICATION forming part of Letters Patent No. 228,555, dated June 8, 1880.

Application filed January 5, 1880.

*To all whom it may concern:*

Be it known that I, CHARLES F. PIKE, of Philadelphia, in the county of Philadelphia and State of Pennsylvania, have invented certain new and useful Improvements in Methods and Means for Operating Pistons of Cylinders; and I do hereby declare the following to be a full, clear, and exact description of the invention, such as will enable others skilled in the art to which it pertains to make and use it, reference being had to the accompanying drawings.

This invention relates to that class of devices in which atmospheric or other pressure is employed, in connection with a non-elastic or incompressible fluid, for actuating a cylinder-piston; and it consists, mainly, in the combination, with a cylinder, of independent reservoirs for the incompressible fluid, and valve mechanism for controlling the pressure upon the fluid, and the consequent flow of the same, as will be fully described hereinafter.

In the drawings, Figure 1 represents a vertical sectional elevation of my invention; Fig. 2, a plan view of the entire valve; Fig. 3, a plan view of the same reversed; Fig. 4, a partial view of the valve plug or key detached; Fig. 5, a transverse sectional elevation on the line $xx$, Fig. 2; Fig. 6, a transverse sectional elevation on the line $yy$, Fig. 2; Fig. 7, a transverse sectional elevation on the line $zz$, Fig. 2; and Fig. 8, a partial perspective view, with portions broken away to show the interior construction, and a partial sectional elevation of the entire mechanism.

To enable others skilled in the art to make and use my invention, I will now proceed to describe fully its construction and manner of operation.

A, Fig. 1, represents a cylinder of the usual well-known or any other proper construction, which is provided at each end with suitable openings communicating with pipes $a\ a'$, extending away to the controlling-valve, hereinafter described.

$a^2$ represents the piston, having the usual piston-rod $a^3$ extending through a proper stuffing-box at one end of the cylinder, which piston-rod is employed in any proper manner to actuate any desired mechanism.

B represents the case of the controlling-valve, and C the plug or key, the latter of which is actuated by any suitable means in such manner as to control properly communication through the parts of the valve or to cut it off entirely, as may be desired.

For convenience the construction and operation of the remaining parts will be described under the different heads, as follows: First, the parts which coact in permitting pressure to be exerted upon the piston $a^2$ through the pipe $a$; second, the parts which coact in permitting the exhaust through the pipe $a'$; third, the arrangement of the parts when pressure is exerted through pipe $a'$.

First. The parts which coact in permitting pressure to be exerted upon the piston $a^2$ through the pipe $a$:

$b$ represents an opening through the valve-case, near the center of the same, into which extends the upper end of pipe $a$, leading from the cylinder.

$b'$ represents a similar opening in the valve-case, upon the side opposite to the opening $b$, and in line therewith, into which extends the upper end of the pipe $d$, hereinafter referred to.

$c$ represents a passage through the valve-plug, which, when the valve is in the position shown in Fig. 1, connects the openings $b\ b'$, as shown in Fig. 8.

D represents a reservoir, of any proper construction, which is provided below with a suitable opening communicating with the pipe $d$, before referred to, which extends into the opening $b'$ of the valve-case, and above with a suitable opening communicating with the pipe $d'$, extending away to the controlling-valve, as shown in Fig. 8. In this reservoir is placed a proper quantity of water or other fluid which is practically incompressible.

$b^2$ represents an opening in the valve-case near one end, into which extends the pipe $d'$, leading from the reservoir D.

$b^3$ represents a groove or passage-way upon the inner side of the case, which, when the valve is in the position shown in Fig. 8, extends from the opening $b^2$ one-fourth of the distance around the case.

$b^4$ represents an opening located in line opposite one end of the groove $b^3$, into which extends one end of the pipe $e$, which latter is extended away to any proper source for supplying atmospheric or other power pressure.

$c'$ represents an opening or passage-way through the plug, which, when the valve is in the position shown in Fig. 8, connects the openings $b^4$ with the groove $b^3$.

When the parts are arranged as thus described and shown atmospheric or other power pressure will be received from the main source of supply through the pipe $e$, and will be delivered, through the valve-passage $c'$, $b^3$, and pipe $d'$, to the resevoir D. The pressure thus exerted upon the incompressible fluid in the reservoir forces the same out through the pipe $d$, valve-passage $c$, and pipe $a$ into the cylinder A upon the left-hand side of the piston.

Second, the parts which coact in permitting the exhaust through the pipe $a'$:

$b^5$ represents an opening into the valve-case, into which extends the upper end of pipe $a'$, leading from the right-hand side of the cylinder A.

$b^6$ represents a similar opening in the valve-case, upon the side opposite to the opening $b^5$, and in line therewith, into which extends one end of the pipe $f$, hereinafter described.

$c^2$ represents the passage-way in the plug, by means of which, when the same is in the position shown in Fig. 8, the openings $b^5$ and $b^6$ are united.

F represents a reservoir like that before referred to, which is provided below with a suitable opening communicating with the pipe $f$, extending to the valve. This reservoir also is provided with a proper quantity of an incompressible fluid.

$b^7$ represents an opening into the valve-case, into which extends one end of the pipe $f'$, leading out of the top of reservoir F, as shown.

$b^8$ represents a similar opening located upon the opposite side of the valve-case, in line therewith, which discharges directly into the atmosphere.

$c^3$ represents an opening or passage-way through the plug, which, when the valve is in the position shown in Fig. 8, unites the openings $b^7$ $b^8$.

When the parts are arranged as thus described and shown and pressure is exerted upon the left-hand side of the piston, as has been previously described, the incompressible fluid in the cylinder on the right-hand side of the piston will be driven out through the pipe $a'$ and through the valve-passage $c^2$ into the reservoir F.

The entrance of the fluid into the reservoir will, in its turn, drive out the air or other elastic medium contained therein and discharge the same through the pipe $f'$, valve-passage $c^3$, and opening $b^8$ into the atmosphere.

The general operation of the parts, when pressure is exerted through the pipe $a$ and the exhaust is delivered through the pipe $a'$, is as follows: Pressure from the main source of power is admitted through the pipe $e$, valve-passage $c'$, groove $b^3$, and pipe $d'$ into the reservoir D, and from this, consequently, the incompressible fluid contained is delivered through the pipe $d$, valve-passage $c$, and pipe $a$ to the left-hand side of the piston. The latter being thus moved in the cylinder toward the right-hand end of the same, the liquid upon the right-hand side is forced before it through the pipe $a'$, valve-passage $c^2$, and pipe $f$ into the reservoir F, and from this, consequently, the air or other elastic medium contained therein is discharged through the pipe $f'$, valve-passage $c^3$, and opening $b^8$ into the open air.

Third, the arrangement of the parts when it is desired to exert the pressure through the pipe $a'$ and discharge the exhaust through the pipe $a$:

When it is desired to shift the valve for the purpose of causing the pressure to be exerted upon the opposite side of the piston, the following parts (not before described) will be employed:

$e'$ represents a pipe communicating with a proper opening located near one end of the valve-case, which, like the pipe $e$, extends away to the main source of power-supply.

$b^9$ represents a groove or passage-way in the valve-case, by means of which communication is established between the pipe $e'$ and the pipe $f'$, when the valve-plug is turned to bring the passage $c^3$ into the position shown in dotted lines, Fig. 8.

When the valve is in the position shown in full lines, Fig. 8, pressure cannot be received through the pipe $e'$ from the main supply, the connection being cut off, as shown; but when the valve is in the position shown in dotted lines in Fig. 8 pressure is received through the pipe $e'$, and the same is delivered to the reservoir F.

$c^4$ represents a passage arranged in the plug at right angles to the passage $c^2$, which serves to continue the connection between the pipes $f$ and $a'$ when the position of the valves is changed, as shown in dotted lines, Fig 8. $c^5$ also represents a passage arranged in the plug at right angles to the passage $c$, which serves to continue the connection between the pipes $a$ and $d$ when the position of valves is changed, as when shown in dotted lines, Fig. 8.

$b^{10}$ represents an opening in the valve-case in line opposite the opening $b^2$, by means of which, when the position of the valve is changed, as shown in dotted lines, Fig. 8, the pipe $d'$ is permitted to discharge through the valve-passage $c'$ into the atmosphere.

By changing the position of the valve communication is cut off, also, with the pipe $e$, leading to the source of the pressure-supply. From this it will be understood that when the valve is shifted in the manner described pressure will be admitted to the opposite end of the cylinder, and the piston consequently will be moved in the opposite direction—that is, to the left-hand end of the same—the operation being the reverse, of course, of that previously described.

When it is desired to hold the piston in any desired position the valve-plug is turned into such relation to its ports as to cut off communication through it, as indicated in part in dotted lines, Fig. 1. When communication is thus cut off the piston is immovably held, in whatever position it may be placed, by the volume of incompressible fluid upon each side of the same, this, for the time being, being held, of course, from movement of any kind.

The incompressible fluid, it will be understood, remains permanently in the reservoir, the cylinder and the pipes connecting the two together, the same being used over and over again, it being only necessary to replace such as is lost by escape or leakage. The exhaust also, it will be understood, is taken from the elastic medium by means of which the pressure is exerted, and not from the incompressible fluid.

Some of the advantages of the described construction are as follows: The incompressible fluid in the reservoir is continuously used, the exhaust being taken from the elastic medium by means of which the pressure is exerted upon the fluid. This continuous use is rendered possible by the employment of two reservoirs. The construction of the mechanism is simple and not liable to get out of order.

Having thus fully described my invention, what I claim as new, and desire to secure by Letters Patent, is—

1. In combination with the cylinder A, having the pipes $a\ a'$, the single controlling-valve and the two independent reservoirs, the valve mechanism being located between the cylinder and the reservoir, substantially as described.

2. In combination with the cylinder A and independent reservoirs D F, intermediate mechanism, substantially as described, adapted to control the flow of fluid into and out of the cylinder and reservoir or to shut it off entirely, as may be desired.

3. In combination with the cylinder, the reservoirs, and the main source of power-supply, a single hand-actuated valve, substantially as described, adapted by a single movement to control the flow from the main source of power-supply to and from the reservoir and to and from the cylinder.

4. In connection with a cylinder and independent reservoir, a valve consisting of the case B, in which are the passages $b^3\ b^9$, and a plug, in which are the passages $c\ c'\ c^2\ c^3\ c^4\ c^5$, for the purpose of controlling the flow of the fluid.

In testimony that I claim the foregoing I have hereunto set my hand this 5th day of December, 1879.

CHARLES F. PIKE.

Witnesses:
E. A. CORBIN,
JOS. J. HAGAN.